United States Patent
Venkataramani et al.

(10) Patent No.: US 6,931,858 B2
(45) Date of Patent: Aug. 23, 2005

(54) ROTATING PULSE DETONATION SYSTEM FOR A GAS TURBINE ENGINE

(75) Inventors: Kattalaicheri Srinivasan Venkataramani, West Chester, OH (US); Lawrence Butler, Cincinnati, OH (US); Ching-Pang Lee, Cincinnati, OH (US); Harvey Michael Maclin, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 211 days.

(21) Appl. No.: 10/422,314

(22) Filed: Apr. 24, 2003

(65) Prior Publication Data

US 2005/0028531 A1 Feb. 10, 2005

(51) Int. Cl.⁷ .............................. F02C 5/04
(52) U.S. Cl. .................. 60/776; 60/226.1; 60/39.38
(58) Field of Search ................ 60/776, 39.34, 60/39.76, 226.1, 247, 39.38

(56) References Cited

U.S. PATENT DOCUMENTS

| | | | |
|---|---|---|---|
| 523,734 A * | 7/1894 | Shaw ........................ 60/39.11 |
| 3,089,307 A * | 5/1963 | Kollander .................. 60/39.34 |
| 5,345,758 A | 9/1994 | Bussing ..................... 60/39.38 |
| 5,901,550 A | 5/1999 | Bussing et al. ............ 60/39.38 |
| 6,349,538 B1 | 2/2002 | Hunter, Jr. et al. ........... 60/204 |
| 6,505,462 B2 | 1/2003 | Meholic .................... 60/39.39 |
| 2004/0000145 A1 * | 1/2004 | Leyva et al. ................. 60/772 |
| 2004/0172950 A1 * | 9/2004 | Venkataramani et al. ..... 60/776 |
| 2004/0194469 A1 * | 10/2004 | Venkataramani ............ 60/776 |
| 2004/0206089 A1 * | 10/2004 | Venkataramani ............ 60/776 |

* cited by examiner

Primary Examiner—Ehud Gartenberg
(74) Attorney, Agent, or Firm—William Scott Andes; James P. Davidson

(57) ABSTRACT

A pulse detonation system for a gas turbine engine having a longitudinal centerline axis extending therethrough includes a rotatable cylindrical member having a forward surface, an aft surface, and an outer circumferential surface, where a plurality of spaced detonation passages are disposed therethrough. Each detonation passage includes at least a portion having a longitudinal axis extending therethrough oriented at a circumferential angle to the longitudinal centerline axis. The pulse detonation system further includes a shaft rotatably connected to the cylindrical member and a stator configured in spaced arrangement with the forward surface of the cylindrical member and a portion of the shaft. The stator has at least one group of ports formed therein alignable with the detonation passages as the cylindrical member rotates. In this way, detonation cycles are performed in the detonation passages so that combustion gases exit the aft surface of the cylindrical member to create a torque which causes the cylindrical member to rotate. Each detonation passage further includes a first end located adjacent the forward surface of the cylindrical member and a second end located adjacent the aft surface of the cylindrical member.

35 Claims, 12 Drawing Sheets

ROTATING PULSE DETONATION SYSTEM FOR A GAS TURBINE ENGINE

BACKGROUND OF THE INVENTION

The present invention relates generally to a pulse detonation system for a gas turbine engine and, in particular, to a pulse detonation system which is able to replace the core of a gas turbine engine without use of an externally actuated valve system.

It is well known that typical gas turbine engines are based on the Brayton Cycle, where air is compressed adiabatically, heat is added at constant pressure, the resulting hot gas is expanded in a turbine, and heat is rejected at constant pressure. The energy above that required to drive the compression system is then available for propulsion or other work. Such gas turbine engines generally rely upon deflagrative combustion to burn a fuel/air mixture and produce combustion gas products which travel at relatively slow rates and constant pressure within a combustion chamber. While engines based on the Brayton Cycle have reached a high level of thermodynamic efficiency by steady improvements in component efficiencies and increases in pressure ratio and peak temperature, further improvements are becoming increasingly costly to obtain.

Accordingly, improvements in engine efficiency have been obtained by operating the engine so that the combustion occurs as a detonation in either a continuous or pulsed mode. Most pulse detonation devices employ detonation tubes that are fed with a fuel/air mixture that is subsequently ignited. A combustion pressure wave is then produced, which transitions into a detonation wave (i.e., a fast moving shock wave closely coupled to the reaction zone). The products of combustion follow the detonation wave and are propagated at the speed of sound relative to the detonation wave while simultaneously providing a significant pressure rise. Such combustion products then exit through a nozzle to produce thrust. Examples of a pulse detonation engine are disclosed in U.S. Pat. No. 5,345,758 to Bussing and U.S. Pat. No. 5,901,550 to Bussing et al.

Simple pulse detonation engines have no moving parts with the exception of various forms of externally actuated valves. Such valves are used to control the duration of the fuel/air introduction and to prevent backflow of combustion products during the detonation process. An example of a rotary valve utilized for pulse detonation engines is disclosed in U.S. Pat. No. 6,505,462 to Meholic. While such pulse detonation configurations have advanced the state of the art, the valves and associated actuators are subjected to very high temperatures and pressures. This not only presents a reliability problem, but can also have a detrimental effect on the turbomachinery of the engine.

One type of pulse detonation system which has eliminated the need for a separate valve is disclosed in a patent application entitled "Pulse Detonation Device For A Gas Turbine Engine," having Ser. No. 10/383,077 being owned by the assignee of the present invention. It will be noted therein that the pulse detonation device includes a stationary air inlet duct and a ring member which rotates therearound. The various events of the detonation take place within detonation ducts associated with the ring member, as air and fuel are injected and a detonation wave is initiated therein. In this configuration, the aft portion of the rotatable ring member is connected to a drive shaft in a cantilevered manner. The air ports, fuel injectors and initiation devices are located adjacent an outer surface of the air inlet duct so as to be sequentially aligned with an inner end of the detonation ducts, which are open at each end, as the ring member rotates.

A second type of pulse detonation system is disclosed in a patent application entitled "Pulse Detonation System For A Gas Turbine Engine," having Ser. No. 10/405,561 and being owned by the assignee of the present invention. It will be seen therein that the pulse detonation system includes a rotatable cylindrical member having a plurality of spaced detonation chambers disposed therein. A stator is configured in spaced arrangement around the forward surface, the aft surface, and the outer circumferential surface of the cylindrical member and a drive shaft connected thereto. The stator has a group of ports formed therein which are in flow communication with the detonation chambers from a position adjacent the outer circumferential surface of the cylindrical member. Detonation cycles are performed in the detonation chambers so that reaction forces induced by the detonation cycles create a torque which causes the cylindrical member to rotate. Each detonation chamber includes a first open end located adjacent the outer circumferential surface of the cylindrical member and a second closed end located within a middle portion of the cylindrical member.

Yet another pulse detonation system owned by the assignee of the present invention is disclosed in a patent application entitled "Pulse Detonation System For A Gas Turbine Engine" having Ser. No. 10/418,859. This system discloses a rotatable cylindrical member having a forward surface, an aft surface, and an outer circumferential surface, where at least one stage of spaced detonation passages are disposed therethrough. In particular, each detonation passage includes a first portion extending from the cylindrical member forward surface to a middle portion of the cylindrical member and a second portion extending from the first portion to the outer circumferential surface of the cylindrical member. The pulse detonation system further includes a shaft rotatably connected to the cylindrical member and a stator configured in spaced arrangement with the forward surface of the cylindrical member and a portion of the shaft. The stator has at least one group of ports formed therein alignable with the detonation passages as the cylindrical member rotates. In this way, detonation cycles are performed in the detonation passages so that combustion gases exit the cylindrical manner in a substantially tangential direction with respect to the outer circumferential surface to create a torque which causes the cylindrical member to rotate. While the configuration disclosed in this patent application is useful for its intended purpose, it is understood that adequate turning of the air and combustion gases exiting the detonation passages is required.

Accordingly, it would be desirable for a pulse detonation system to be developed for a gas turbine engine which is able to operate the engine without the need for a separate valve and without causing adverse effects on the other components of the gas turbine engine. Further, it would be desirable for such pulse detonation system to be adaptable to a gas turbine engine for both aeronautical and industrial applications so as to eliminate the core (i.e., a high pressure compressor, combustor, and high pressure turbine). It is also desirable that the pulse detonation system include a cylindrical member which is better able to sustain the centrifugal load and high pressures generated during the detonation process while avoiding the need to turn flows through the detonation passages thereof.

BRIEF SUMMARY OF THE INVENTION

In a first exemplary embodiment of the invention, a pulse detonation system for a gas turbine engine is disclosed as having a longitudinal centerline axis extending therethrough. The pulse detonation system includes a rotatable cylindrical member having a forward surface, an aft surface, and an outer circumferential surface, where a plurality of spaced detonation passages are disposed therethrough. Each detonation passage includes at least a portion thereof with a longitudinal axis extending therethrough oriented at a circumferential angle to the longitudinal centerline axis. A shaft is rotatably connected to the cylindrical member and a stator is configured in spaced arrangement with the forward surface of the cylindrical member and a portion of the shaft. The stator further includes at least one group of ports formed therein alignable with the detonation passages as the cylindrical member rotates. In this way, detonation cycles are performed in the detonation passages so that combustion gases exit the aft surface of the cylindrical member to create a torque which causes the cylindrical member to rotate. Each detonation passage further includes a first end located adjacent forward surface of the cylindrical member and a second end located adjacent the aft surface of the cylindrical member.

In a second exemplary embodiment of the invention, a method of providing power to a drive shaft in a gas turbine engine is disclosed as including the following steps: providing a rotatable cylindrical member having a plurality of spaced detonation passages disposed therethrough at a circumferential angle to a longitudinal centerline axis through the cylindrical member; providing a stator in spaced relation to a forward surface of the cylindrical member, where the stator has at least one group of ports formed therein; connecting the cylindrical member to a drive shaft; performing a detonation cycle in each detonation passage; and, producing a torque on the cylindrical member which causes the cylindrical member and the drive shaft to rotate. The detonation cycle further includes the steps of supplying compressed air to the detonation passages, injecting fuel into the detonation passages, initiating a detonation wave in the detonation passages, and exhausting products of combustion from the detonation passages through an aft surface of the cylindrical member. The method may also include the step of causing the cylindrical member to rotate at a predetermined speed prior to injecting fuel into the detonation passages.

In accordance with a third embodiment of the invention, a gas turbine engine is disclosed as including: a fan section at a forward end of the gas turbine engine including at least a first fan blade row connected to a drive shaft; a booster compressor positioned downstream of the fan section, where the booster compressor includes a first compressor blade row and a second compressor blade row connected to the drive shaft and interdigitated with the first compressor blade row; and, a pulse detonation system for powering the drive shaft. The pulse detonation system further includes a rotatable cylindrical member having a forward surface, an aft surface, and an outer circumferential surface, where the cylindrical member has a plurality of detonation passages disposed therethrough and the cylindrical member is connected to the drive shaft. Each detonation passage includes at least a portion thereof with a longitudinal axis extending therethrough oriented at a circumferential angle to the longitudinal centerline axis. A stator is also configured in spaced arrangement with the forward surface of the cylindrical member and a portion of the shaft with the stator including at least one group of ports formed therein alignable with the detonation passages as the cylindrical member rotates. In this way, detonation cycles are performed in the detonation passages so that combustion gases exit the aft surface of the cylindrical member to create a torque which causes the cylindrical member to rotate and power the fan section and the booster compressor. Each group of ports in the stator further includes an air port in flow communication with a source of compressed air, a fuel port in flow communication with a fuel source, and a port having a device associated therewith for initiating a detonation in the detonation passages.

In accordance with a fourth embodiment of the present invention, a gas turbine engine is disclosed as including: a bellmouth at a forward end of the gas turbine engine; a compressor positioned downstream of and in flow communication with the bellmouth, where the compressor includes a first compressor blade row and a second blade row connected to a drive shaft and interdigitated with the first compressor blade row; a load connected to the drive shaft; and, a pulse detonation system for powering the drive shaft. The pulse detonation system further includes a rotatable cylindrical member having a forward surface, an aft surface, and an outer circumferential surface, where the cylindrical member has a plurality of spaced detonation passages disposed therethrough and is connected to the drive shaft. Each detonation passage includes at least a portion thereof with a longitudinal axis extending therethrough oriented at a circumferential angle to the longitudinal centerline axis. A stator is configured in spaced arrangement to the forward surface of the cylindrical member and a portion of the shaft, with the stator including at least one group of ports formed therein alignable with the detonation passages as the cylindrical member rotates. In this way, detonation cycles are performed in the detonation passages so that combustion gases exit the aft surface of the cylindrical member to create a torque which causes the cylindrical member to rotate and power the compressor and the load. Each group of ports in the stator further includes an air port in flow communication with a source of compressed air, a fuel port in flow communication with a fuel source, and a port having a device associated therewith for initiating a detonation in the detonation passages.

DETAILED DESCRIPTION OF THE INVENTION

Figure 1:
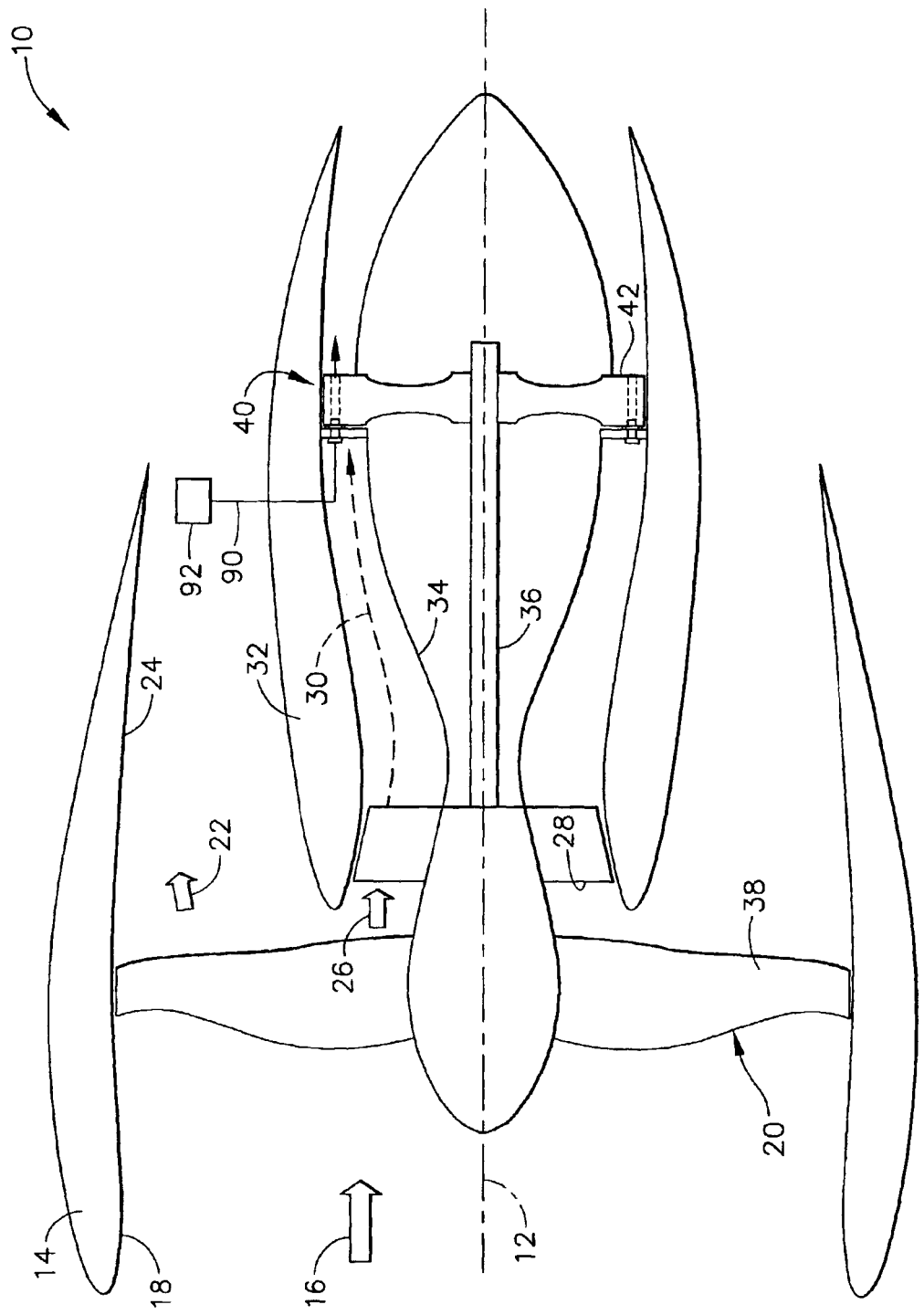
FIG. 1 is a longitudinal schematic sectional view of a first gas turbine engine configuration including a pulse detonation system in accordance with the present invention.

Referring now to the drawings in detail, wherein identical numerals indicate the same elements throughout the figures, FIG. 1 schematically depicts an exemplary gas turbine engine 10 (high bypass type) utilized with aircraft having a longitudinal or axial centerline axis 12 therethrough for reference purposes. Gas turbine engine 10 includes a nacelle 14 to assist in directing a flow of air (represented by arrow 16) through an inlet 18 to a fan section 20 as is well known. Air flow 16 is then split downstream of fan section 20 so that a first portion (represented by arrow 22) flows through an outer duct 24 and a second portion (represented by arrow 26) is provided to a booster compressor 28.

In the high bypass configuration depicted, it will be understood that booster compressor 28 preferably provides a compressed air flow 30 which is bounded by an inner bypass platform 32 and a gooseneck inner flow path 34. It will be noted that booster compressor 28 preferably includes at least one compressor stage with a stationary compressor blade row and a compressor blade row connected to a drive shaft 36 and interdigitated with the stationary compressor blade row associated with each compressor stage. It will be appreciated that additional booster compressor stages may be provided as desired. A first fan blade row 38 is also preferably connected to drive shaft 36.

Drive shaft 36 is preferably powered by means of a pulse detonation system 40 in accordance with the present invention. More specifically, pulse detonation system 40 includes a rotatable cylindrical member 42 having a forward surface 44, an aft surface 46, an outer circumferential surface 48 and a middle portion 50 having a radius 51. Cylindrical member 42 further includes a plurality of detonation passages 52 disposed therethrough. Each detonation passage 52 is formed to include a first end 54 located adjacent forward surface 44 of cylindrical member 42 and a second end 56 located adjacent aft surface 46 of cylindrical member 42.

Figure 6:
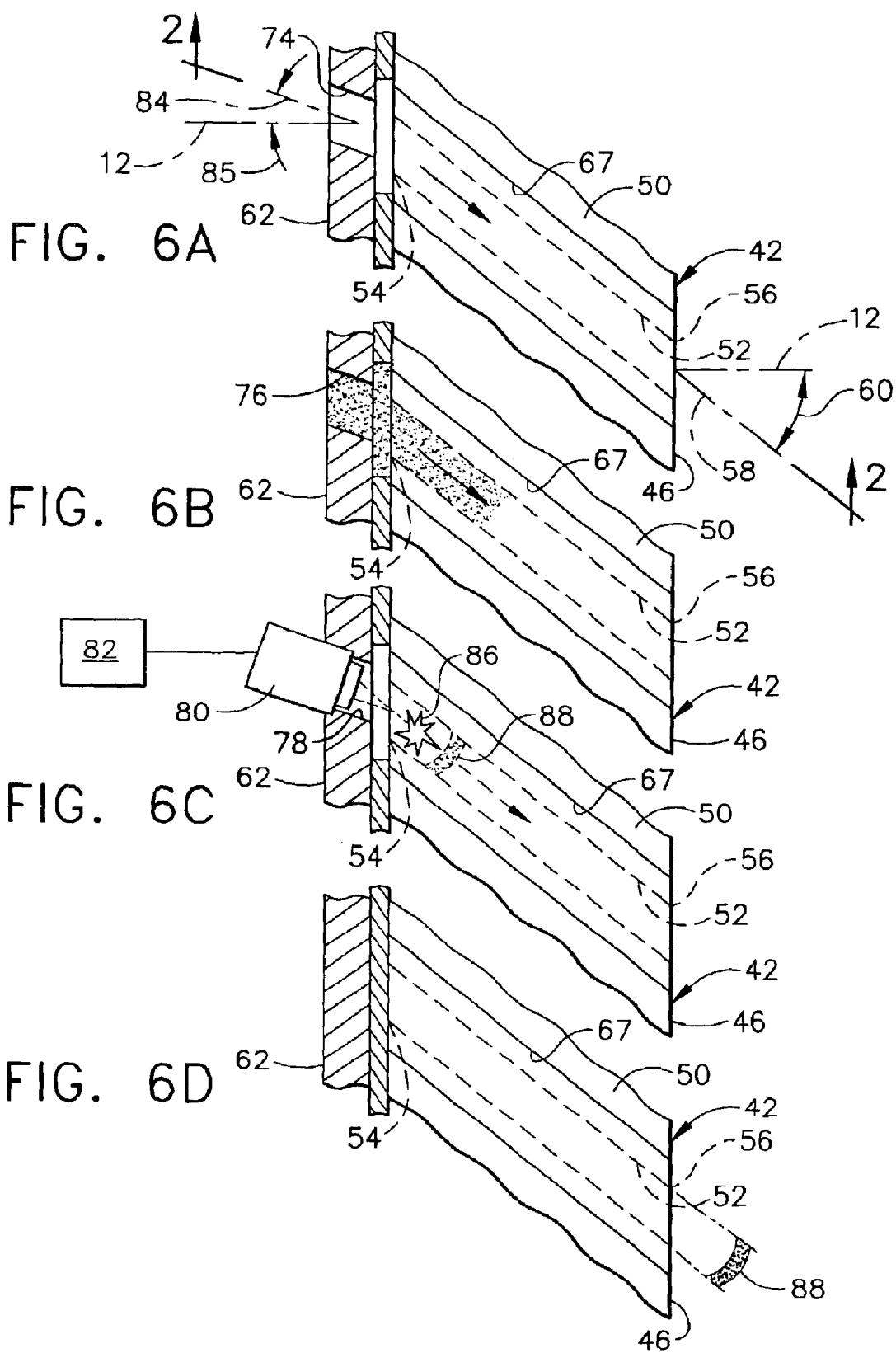
FIGS. 6A–6D are a diagrammatic view of a detonation passage for the pulse detonation system depicted in FIGS. 2–5 undergoing a specified sequence of events in a detonation cycle.

Each detonation passage 52 preferably has a substantially circular cross-section throughout the length of at least a portion thereof, although such cross-section may also be non-circular. Further, each detonation passage 52 is preferably substantially linear and has a longitudinal axis 58 extending through at least a portion thereof at a circumferential angle 60 to longitudinal centerline axis 12. As best depicted in FIG. 6, angle 60 is preferably an acute angle which preferably is within a range of approximately 20–85° and optimally within a range of approximately 40–75°. It will be appreciated, however, that the optimal angular orientation of detonation passages 52 is preferably determined by an analysis of the velocity vectors for inlet air supplied by air port 74 and fuel from fuel port 76 in light of the rotational velocity of cylindrical member 42 over a range of operating conditions for the engine. Accordingly, detonation passages 52 have an eccentric orientation with respect to longitudinal centerline axis 12. It will be understood that detonation passage 52 may also be oriented at a radial angle to longitudinal centerline axis 12 so long as circumferential angle 60 is maintained.

Figure 7:
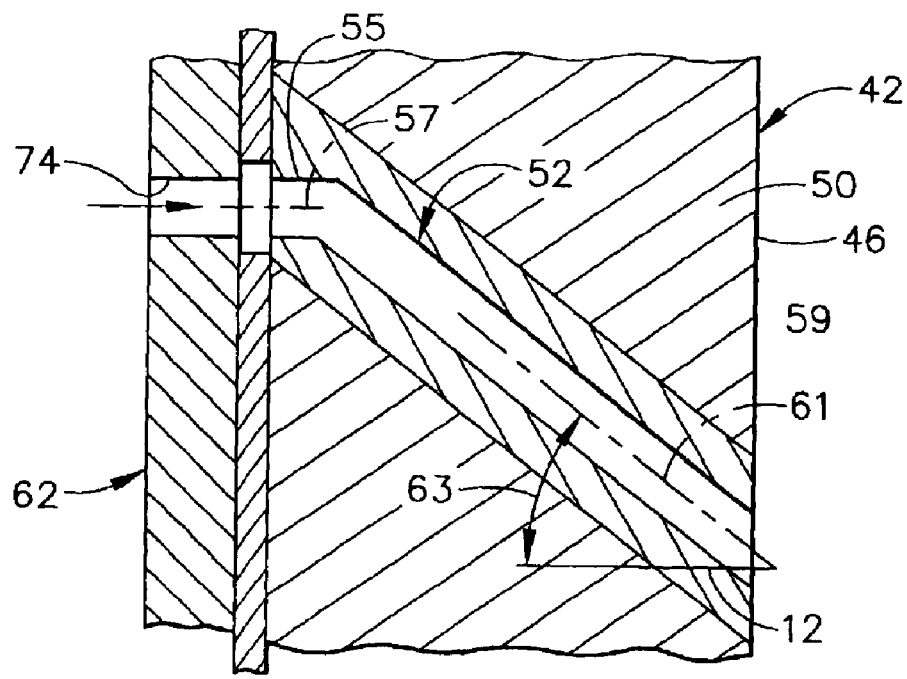
FIG. 7 is a diagrammatic view of a detonation passage for the pulse detonation system depicted in FIGS. 2–5 having an alternative configuration.

Detonation passages 52 may be substantially non-linear so long as at least a portion thereof maintains the eccentric orientation with respect to longitudinal centerline axis 12. In this regard, it will be seen from FIG. 7 that detonation passage 52 may include a first portion 55 including a longitudinal axis 57 extending therethrough oriented substantially parallel to longitudinal centerline axis 12 and a second portion 59 in flow communication with first portion 55 including a longitudinal axis 61 extending therethrough which is oriented at a predetermined circumferential angle 63 to longitudinal axis 59. Accordingly, second portion 59 of detonation passage 52 is likewise oriented at angle 63 to longitudinal centerline axis 12 and angle 63 is preferably in a range of approximately 20–85' like angle 60 described above or optimally in a range of approximately 40–75°. Although not shown, detonation passage 62 may be curved so as to obtain a similar eccentric orientation with respect to longitudinal centerline axis 12.

Figures 2, 3:
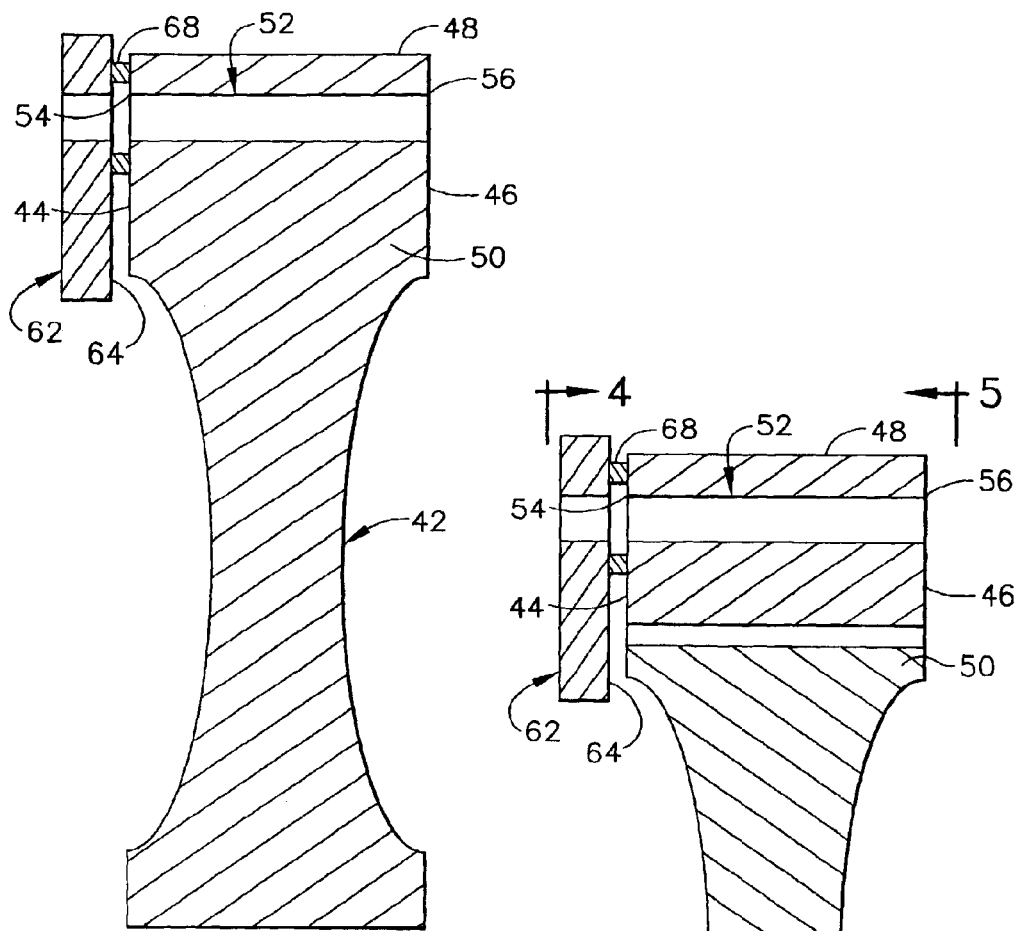
FIG. 2 is an enlarged, partial longitudinal schematic sectional view of the gas turbine engine depicted in FIG. 1, wherein a portion of the pulse detonation system taken through line 2—2 of FIG. 6 is shown in greater detail.
FIG. 3 is an enlarged, partial longitudinal schematic sectional view of an alternative configuration for the pulse detonation system depicted in FIG. 2.
Figure 5:
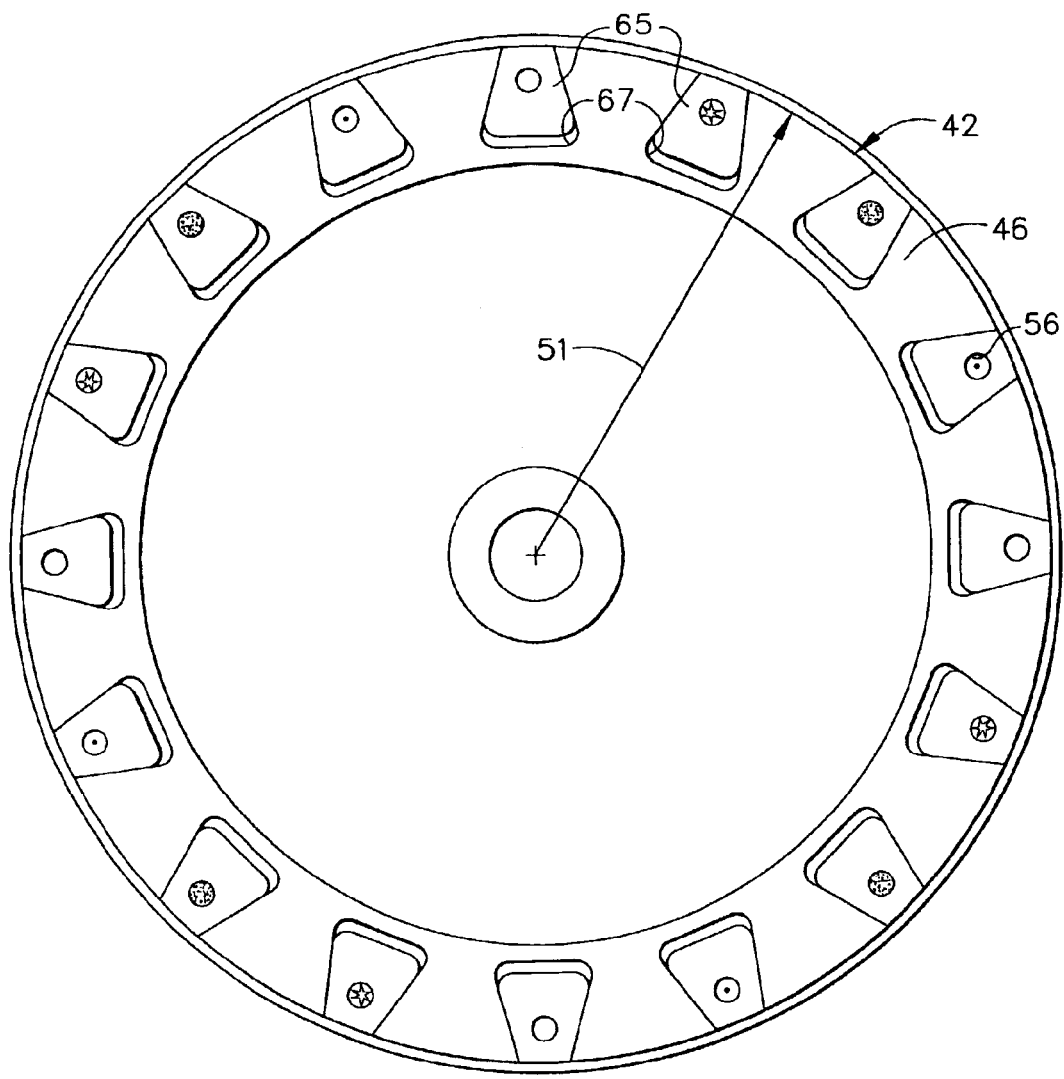
FIG. 5 is an aft view of the pulse detonation system depicted in FIG. 3.

It is further preferred that detonation passages 52 of each detonation stage be symmetrically spaced circumferentially within cylindrical member 42. The number of detonation passages 52 provided within cylindrical member 42 is dependent upon several factors, including angle 60 (or angle 63) of each detonation passage 52 and radius 51 of cylindrical member 42. It will also be noted that detonation passages 52 may be integral with cylindrical member 42 as seen in FIG. 2. In an alternative configuration depicted in FIGS. 3 and 5, a plurality of replaceable segments 65 are connected to cylindrical member 42 (e.g., via dovetail slots 67 formed in cylindrical member 42), where each annular segment 65 preferably includes at least one detonation passage 52 formed therein.

Pulse detonation system 40 further includes a stator 62 which is configured in spaced arrangement with respect to forward surface 44 of cylindrical member 42, as well as a portion of drive shaft 36. It will be seen that stator 62 is substantially annular and preferably includes a plurality of seals 68 circumferentially spaced and positioned between forward surface 44 of cylindrical member 42 and a rear surface 64 of stator 62 so as to prevent flow between ports.

Stator 62 further includes at least one group of ports 72 formed therein. It will be understood that each port group 72 has an air port 74 in flow communication with a source of compressed air (e.g., compressed air flow 30 from booster compressor 28), a fuel port 76 in flow communication with a fuel source, and a port 78 having a device 80 associated therewith for initiating a detonation in detonation passages 52 (see FIG. 6). It is contemplated that exemplary initiation devices 80 may include an igniter (e.g., a high energy spark plug, a torch igniter having separate fuel and oxidizer, or a plasma jet igniter), a laser, or a shock focus device. Initiation device 80 may be activated when port 78 is in communication with each detonation passage 52 so as to assist in producing a detonation wave in all detonation passages 52 or in accordance with a predetermined delay so that only certain detonation passages 52 are utilized for this purpose. A control device 82 is preferably provided to control the initiation of detonations within detonation passages 52 (see FIG. 6C).

Figure 16:
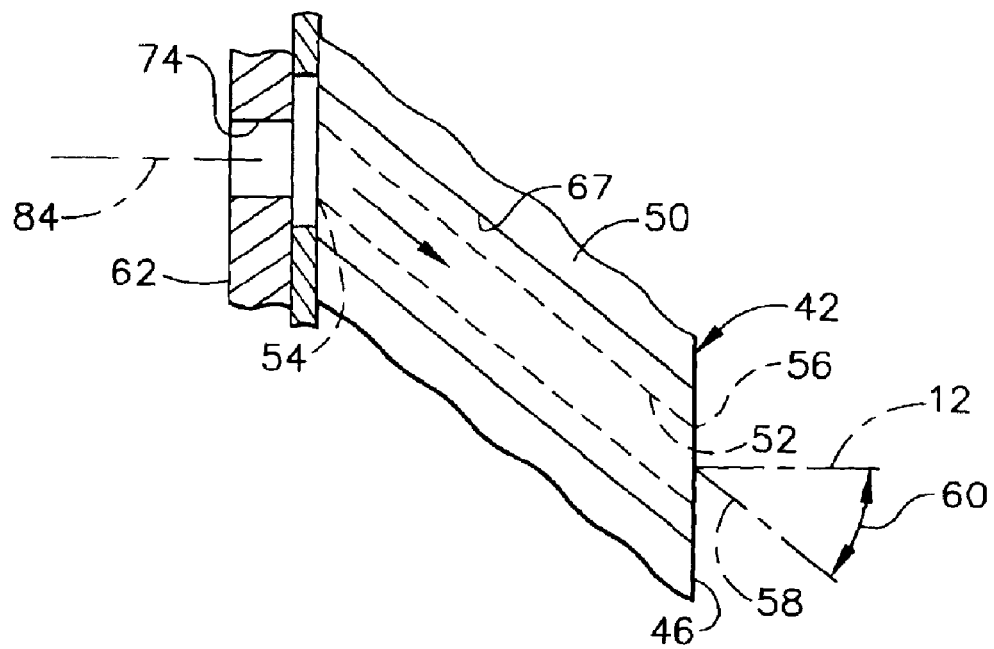

It will be seen that airport 74, fuel port 76 and initiation port 78 of each port group 72 are preferably oriented in stator 62 so that the velocity vectors of the fuel and air provided are aligned with each detonation passage 52 in a predetermined timing and sequence as cylindrical member 42 rotates. Accordingly, ports 74, 76 and 78 are oriented substantially axially so that a longitudinal axis 84 through such ports is oriented substantially parallel to longitudinal centerline axis 12 (see FIG. 16). Alternatively, longitudinal axis 84 through detonation passage 52 will extend at a circumferential angle 85 to longitudinal centerline axis 12 which preferably is less than circumferential angle 60 of detonation passage 52 (see FIG. 6A). In either case, detonation cycles are able to be performed in detonation passages 52 so that combustion gases following detonation waves through detonation passages 52 during such detonation cycles exit aft surface 46 of cylindrical member 42 to create a torque that causes cylindrical member 42 to rotate.

With respect to the detonation cycle performed in each detonation passage 52, FIGS. 6A–6D represent a preferred sequence of events which takes place according to a predetermined timing. In FIG. 6A, detonation passage 52 is preferably filled with compressed air from air port 74, which also serves to purge remaining combustion products from the previous detonation cycle. Next, FIG. 6B depicts the injection of fuel in detonation passage 52 via fuel port 76. As seen in FIG. 6C, device 80, via initiation port 78, preferably initiates detonation of the fuel/air mixture in detonation passage 52 at an initiation point 86 so that a detonation wave 88 is formed. Detonation wave 88 then travels through detonation passage 52, as seen in FIG. 6D. Accordingly, combustion gases follow detonation wave 88 out detonation passage 52 and are exhausted out aft surface 46 of cylindrical member 42 to create a torque on cylindrical member 42.

It will be appreciated that prior to the occurrence of any detonation cycles within detonation passages 52, cylindrical member 42 is preferably driven so as to obtain a predetermined rotational speed. This is caused by supplying compressed air to detonation passages 52 via air ports 74 at a relatively higher pressure than the pressure at which air is discharged from detonation passages 52. Once the predetermined rotational speed of cylindrical member 42 is achieved, fuel is then supplied to detonation passages 52 in accordance with the detonation cycle described hereinabove.

Figure 4:
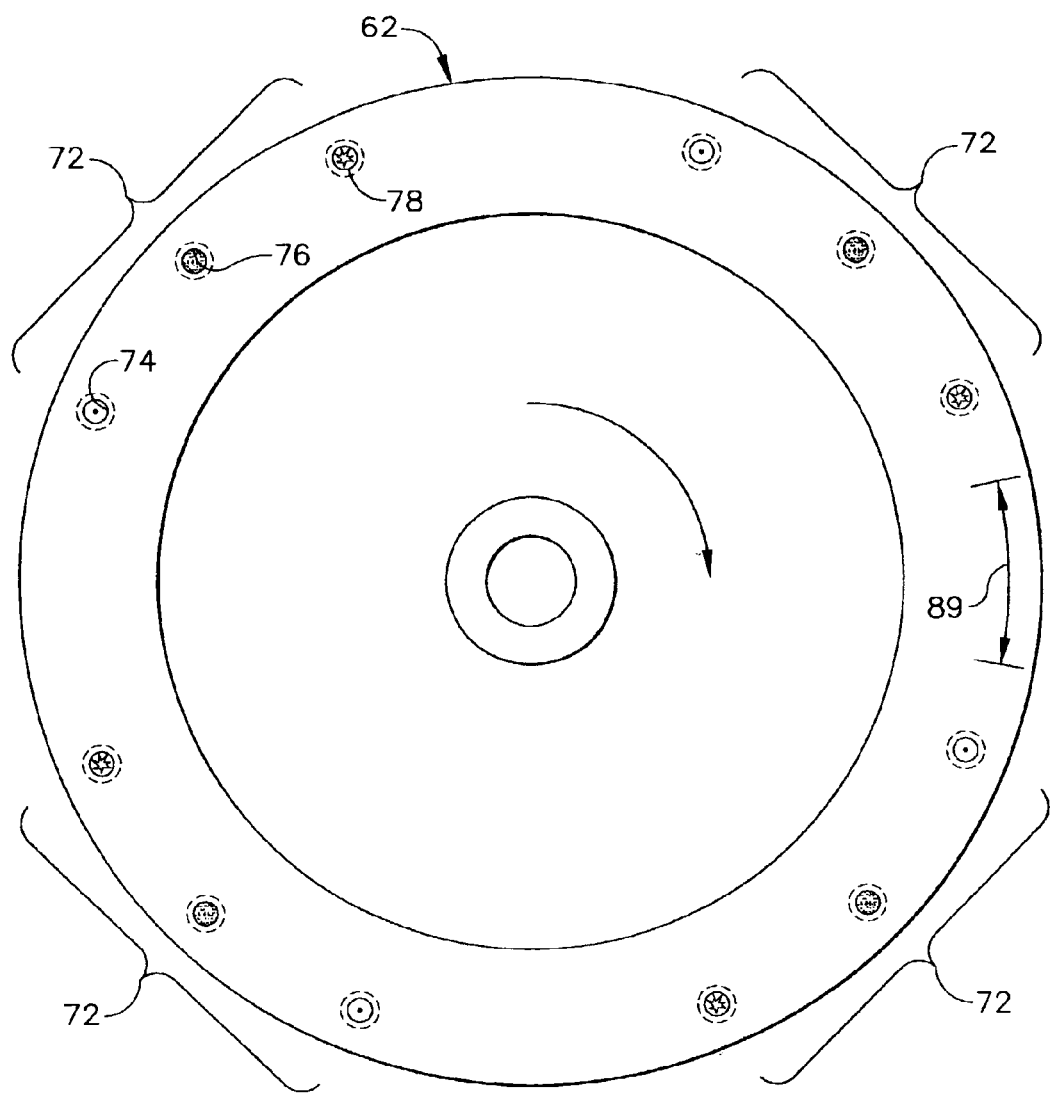
FIG. 4 is a front view of the pulse detonation system depicted in FIGS. 2 and 3.

It will be appreciated that a plurality of port groups 72 may be provided in stator 62, wherein a plurality of detonation cycles are able to occur in each detonation passage 52 during a revolution of cylindrical member 42. Such port groups 72 are preferably spaced symmetrically around stator 62, although it is not required. Moreover, while the number of port groups 72 may be equivalent to the number of detonation passages 52 provided in cylindrical member 42 as seen in FIG. 4, there may be more or less as desired. In any event a predetermined amount of circumferential space 89 is provided between each port group 72, as well as between each individual port thereof. Such circumferential spacing may be equivalent to a replaceable segment 65 which does not include a detonation passage therethrough, as in the embodiment depicted in FIGS. 3 and 5.

Another aspect of pulse detonation system 40 is the manner in which fuel is supplied to fuel ports 76 for injection into detonation passages 52. In one embodiment, a fuel manifold 90 is provided upstream of stator 62 (see FIG. 1). Fuel manifold 90 is preferably in flow communication with a fuel supply (not shown) at one end and is also in flow communication with fuel ports 76 at a second end so that fuel is supplied thereto as part of the detonation cycle in detonation passages 52 described herein. A device 92 is provided to control the injection of fuel from fuel manifold 90.

Figure 8:
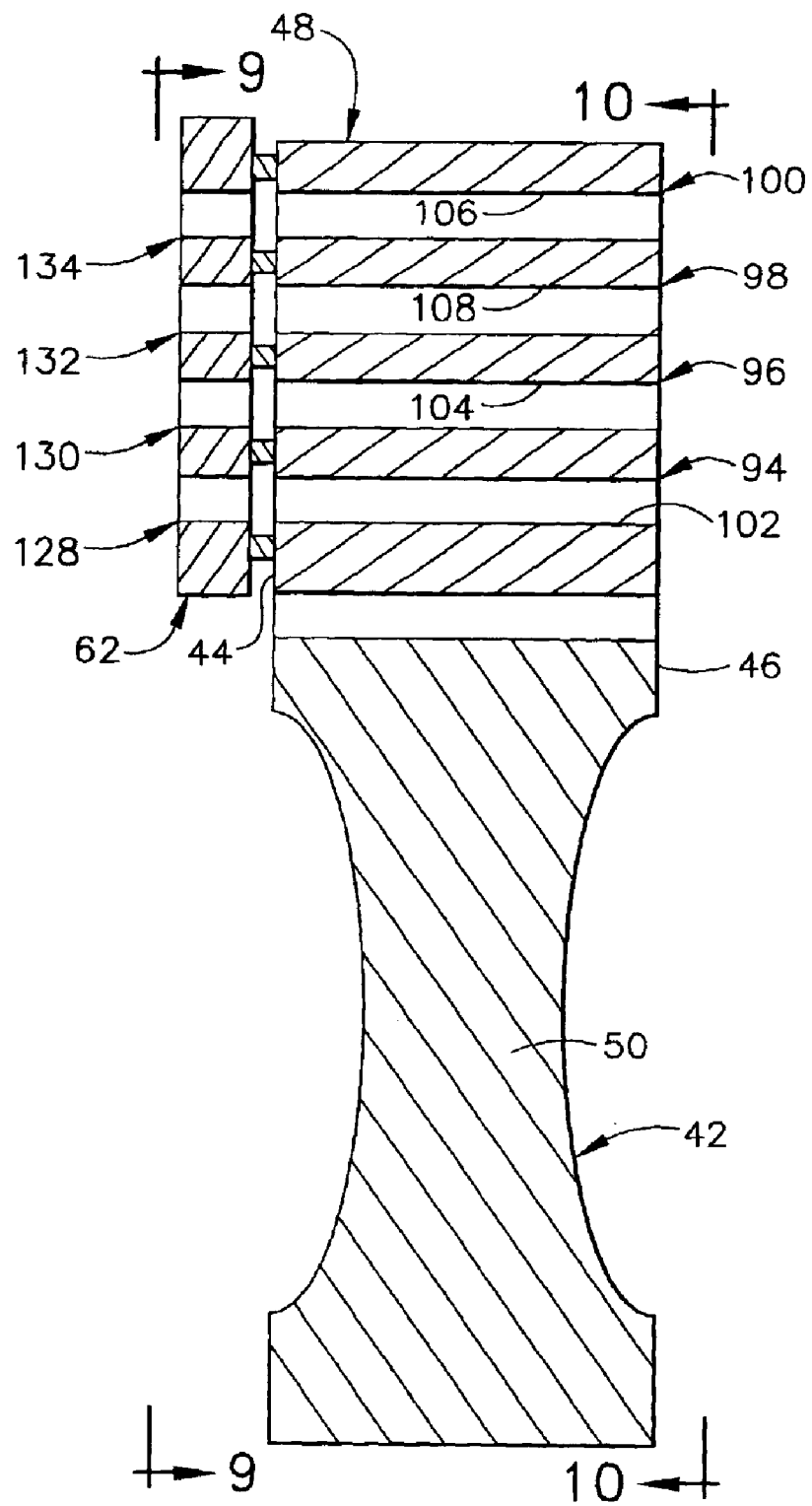
FIG. 8 is an enlarged, partial longitudinal schematic sectional view of the gas turbine engine depicted in FIG. 1, wherein a second alternative configuration of the pulse detonation system is shown in greater detail.
Figure 9:
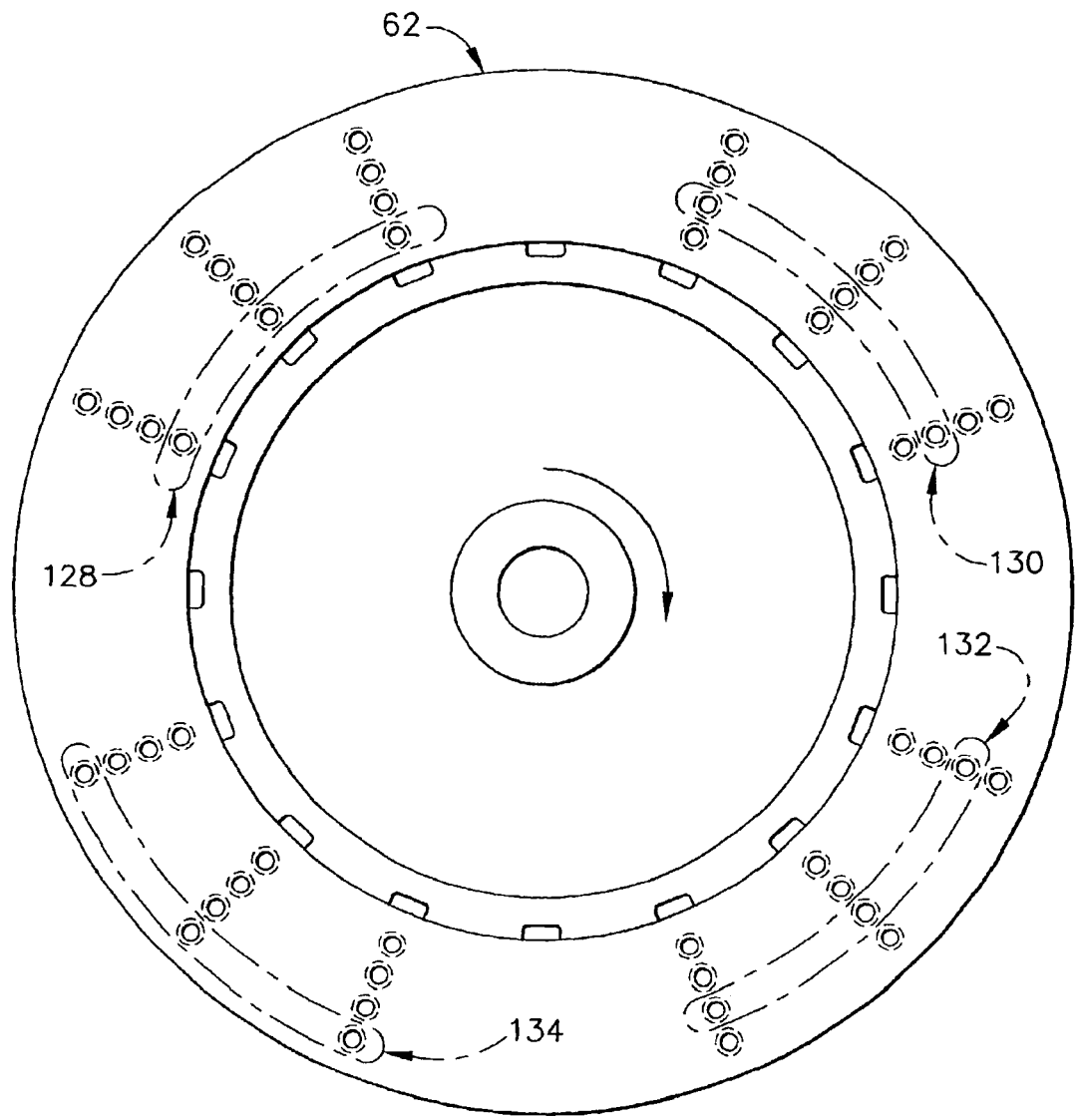
FIG. 9 is a front view of the pulse detonation system depicted in FIG. 8.
Figure 10:
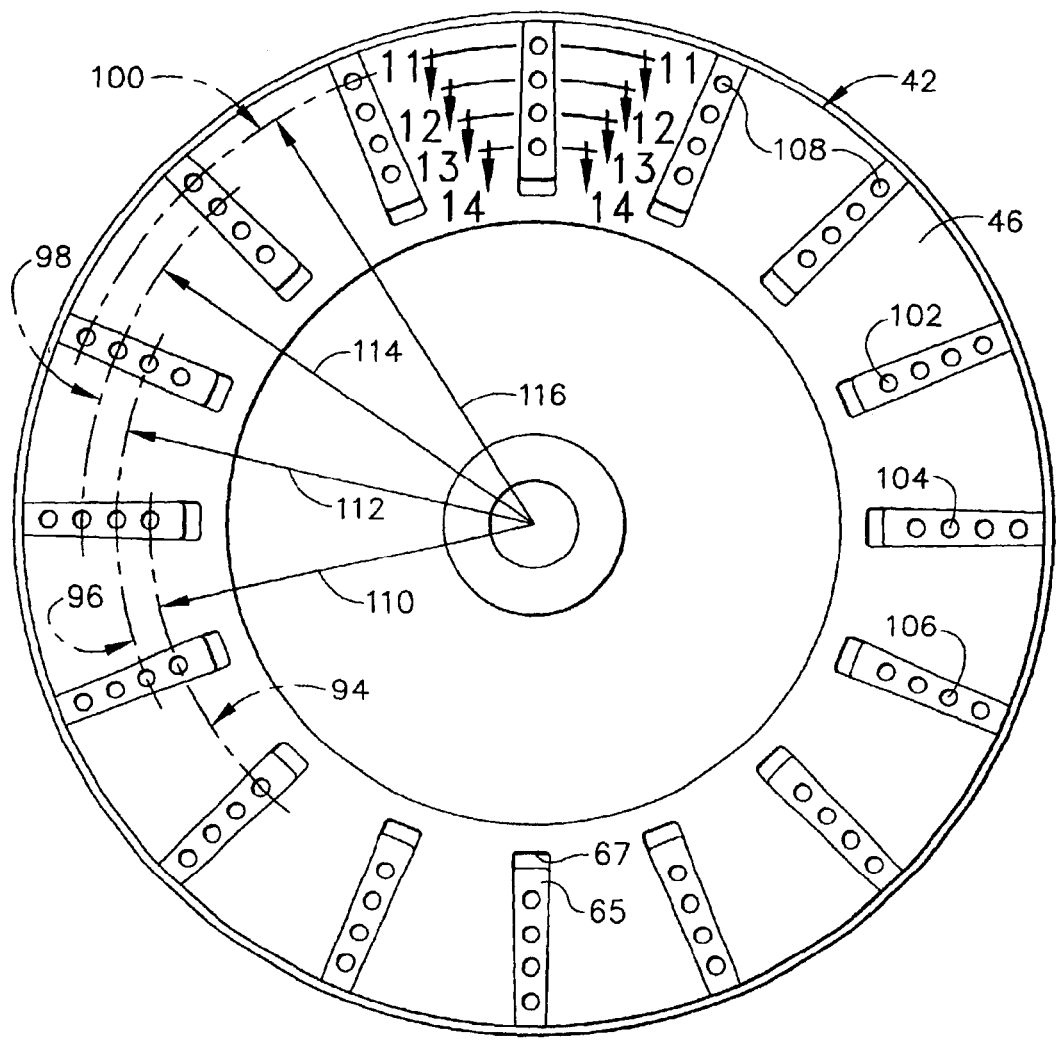
FIG. 10 is an aft view of the pulse detonation system depicted in FIG. 8.
Figure 11:
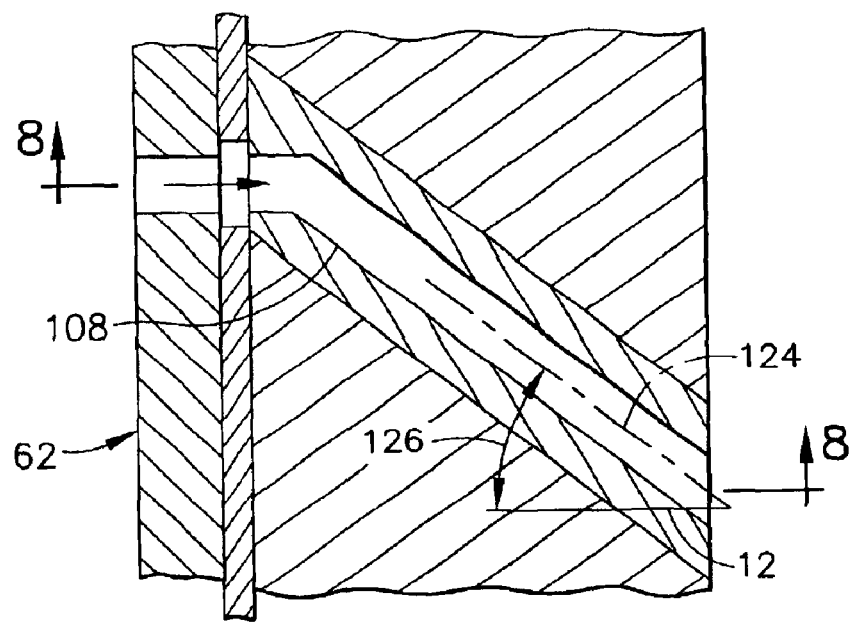
FIG. 11 is a diagrammatic view of a detonation passage for a first stage of the pulse detonation system depicted in FIGS. 8–10 taken along line 11—11 of FIG. 10.
Figure 12:
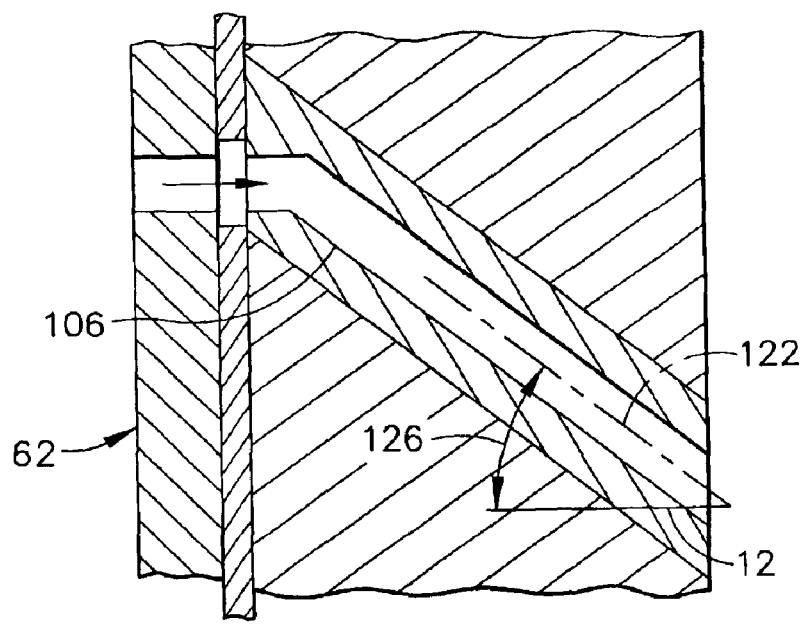
FIG. 12 is a diagrammatic view of a detonation passage for a second stage of the pulse detonation system depicted in FIGS. 8–10 taken along line 12—12 of FIG. 10.
Figure 13:
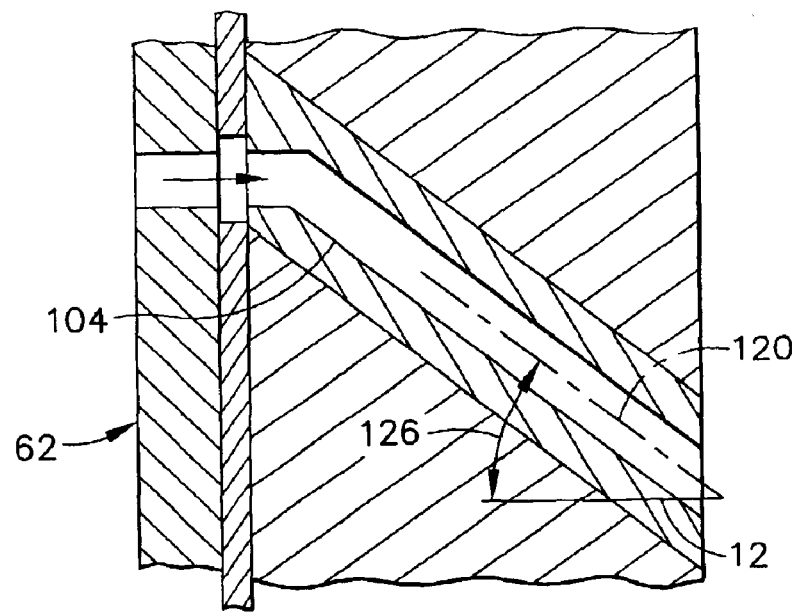
FIG. 13 is a diagrammatic view of a detonation passage for a third stage of the pulse detonation system depicted in FIGS. 8–10 taken along line 13—13 of FIG. 10.
Figure 14:
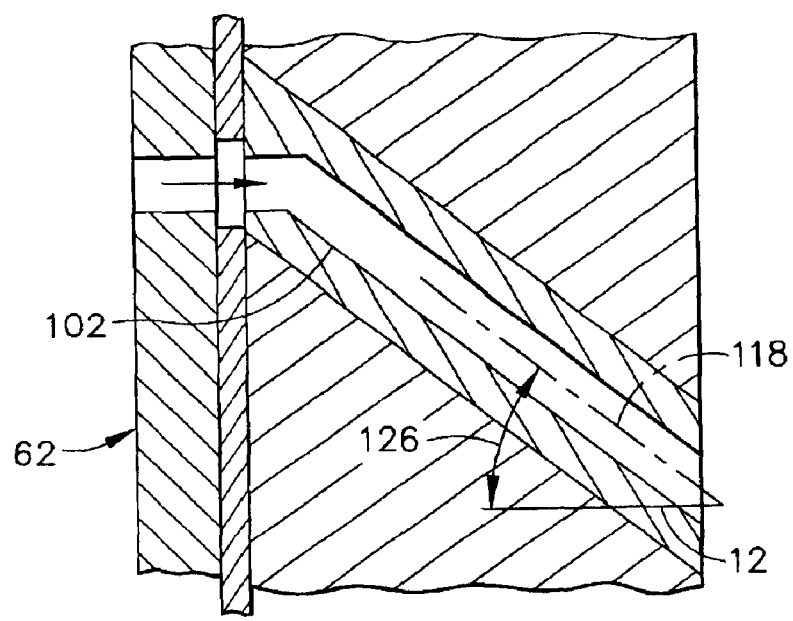
FIG. 14 is a diagrammatic view of a detonation passage for a fourth stage of the pulse detonation system depicted in FIGS. 8–10 taken along line 14—14 of FIG. 10.

FIGS. 8–10 depict an alternative embodiment for pulse detonation system 40, where a plurality of detonation stages 94, 96, 98 and 100 of detonation passages 102, 104, 106 and 108 are disposed through cylindrical member 42. Detonation passages 102, 104, 106 and 108 are preferably positioned radially adjacent to each other and are arranged in an annular configuration having distinct radii 110, 112, 114 and 116 (see FIG. 10). As described hereinabove with respect to detonation passage 52, each detonation passage of each detonation stage includes a forward end located adjacent forward surface 44 of cylindrical member 42 and an aft end located adjacent aft surface 46 of cylindrical member 42. Similarly, detonation passages 102, 104, 106 and 108 preferably include longitudinal axes 118, 120, 122 and 124, respectively, which are oriented at a substantially constant circumferential angle 126 to longitudinal centerline axis 12 (see FIGS. 11–14) similar to angles 60 and 63 described herein. While shown in a non-linear configuration, it will be appreciated that detonation passages 102, 104, 106 and 108 may be linear as described herein with respect to FIGS. 6A–6D and FIG. 16.

It is also preferred that detonation passages 102, 104, 106 and 108 be aligned substantially radially and circumferentially in order to simplify construction and supplying air and fuel thereto. Nevertheless, it will be understood that such detonation passages 102, 104, 106 and 108 may be staggered circumferentially if desired. In either case, the detonation cycles performed in each detonation passage is like that previously described herein. It will also be appreciated that stator 62 will preferably include at least one group of ports 128, 130, 132 and 134 formed therein which are preferably positioned so that the velocity vectors of the fuel and air provided therefrom are aligned with detonation passages 102, 104, 106 and 108, respectively, as cylindrical member 42 rotates. While the stator ports are depicted as being substantially parallel to longitudinal centerline axis 12 in FIGS. 11–14, such ports may be oriented at a slight angle thereto as described herein with respect to FIGS. 6A–6D and FIG. 16. Each port group will preferably include an air port, a fuel port and an initiation port like that described with respect to port group 72.

Figure 15:
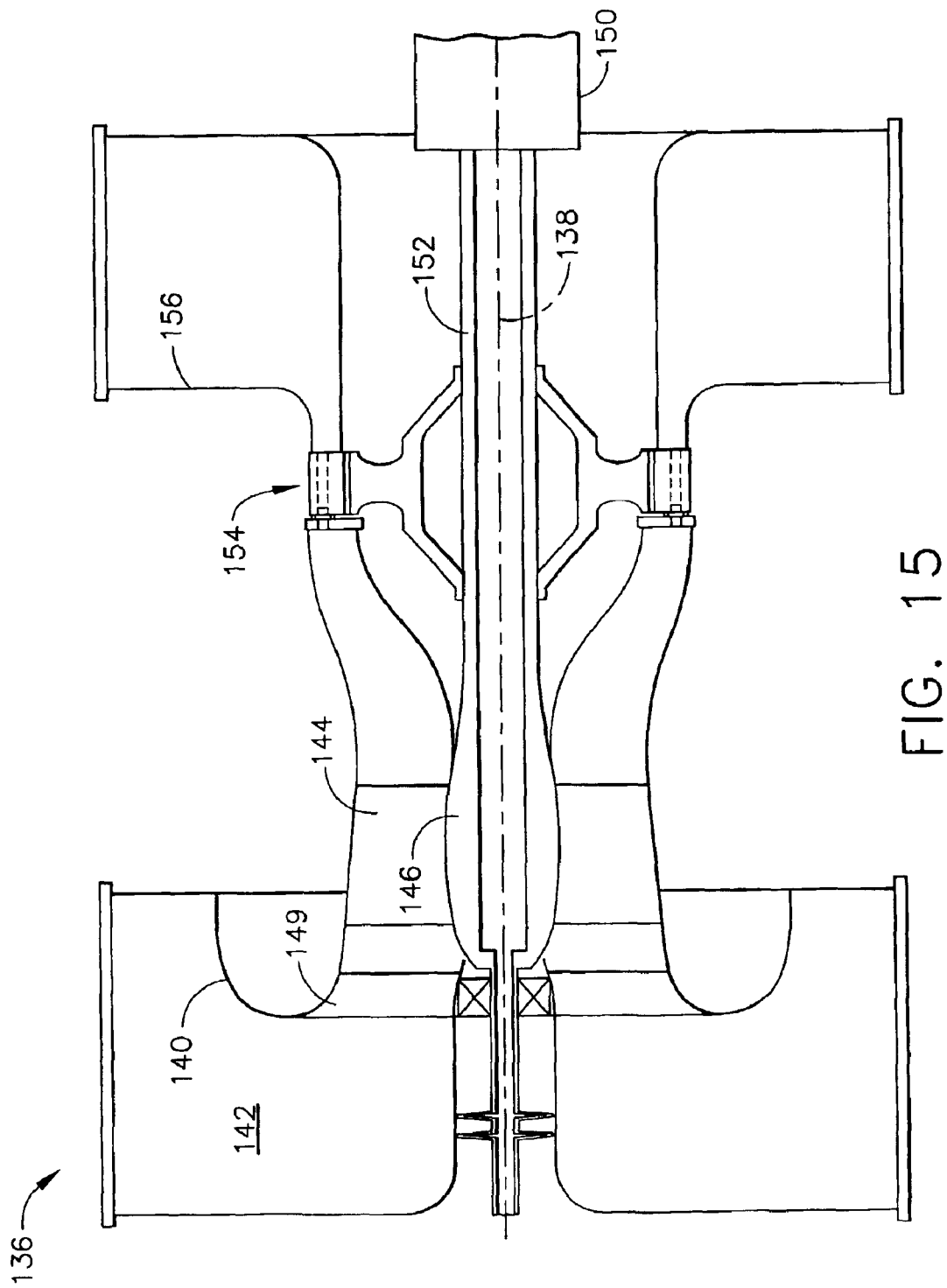
FIG. 15 is a longitudinal schematic sectional view of a second gas turbine engine configuration including a pulse detonation system in accordance with the present invention; and, FIG. 16 is a diagrammatic view of a detonation passage for the pulse detonation system as depicted in FIG. 6A, where the port for the stator has a different orientation.

FIG. 15 depicts an alternative gas turbine engine 136 is depicted for use in industrial and other shaft power applications (e.g., marine or helicopter propulsion) as having a longitudinal centerline axis 138. As seen therein, gas turbine engine 136 includes a bellmouth 140 at an inlet 142 and a booster compressor 144 positioned downstream of and in flow communication with bellmouth 140. Booster compressor 144 preferably includes at least a first stationary compressor blade row connected to a drive shaft 146 and a second stationary compressor blade row interdigitated with first compressor blade row. Additional compressor blade rows may be connected to drive shaft 146, with additional stationary compressor blade rows interdigitated therewith.

An inlet guide vane 149 may be positioned at an upstream end of booster compressor 144 to direct the flow of air therein. A load 150 is also connected to drive shaft 146 via a second drive shaft 152. A pulse detonation system 154 like that described hereinabove is provided for powering drive shaft 146, with an exhaust duct 156 being in flow communication with pulse detonation system 154 so that combustion gases are able to exit therefrom.

Having shown and described the preferred embodiment of the present invention, further adaptations of the pulse detonation system can be accomplished by appropriate modifications by one of ordinary skill in the art without departing from the scope of the invention. Moreover, it will be understood that pulse detonation system 40 may be utilized with other types of gas turbine engines not depicted herein.

What is claimed is:

1. A pulse detonation system for a gas turbine engine having a longitudinal centerline axis extending therethrough, comprising:
   (a) a rotatable cylindrical member having a forward surface, an aft surface, and an outer circumferential surface, said cylindrical member including at least one stage of spaced detonation passages disposed therethrough, each said detonation passage including at least a portion thereof with a longitudinal axis extending therethrough which is oriented at a circumferential angle to said longitudinal centerline axis;
   (b) a shaft rotatably connected to said cylindrical member; and,
   (c) a stator configured in spaced arrangement with said forward surface of said cylindrical member and a portion of said shaft, said stator including at least one group of ports formed therein alignable with said detonation passages as said cylindrical member rotates;

wherein detonation cycles are performed in said detonation passages so that combustion gases exit said aft surface of said cylindrical member to create a torque which causes said cylindrical member to rotate.

2. The pulse detonation system of claim 1, each said detonation passage including a first end located adjacent said forward surface of said cylindrical member and a second end located adjacent said aft surface of said cylindrical member.

3. The pulse detonation system of claim 1, wherein each said detonation passage is substantially linear.

4. The pulse detonation system of claim 1, wherein each said detonation passage is substantially non-linear.

5. The pulse detonation system of claim 4, wherein said detonation passages are oriented at an angle to said longitudinal centerline axis in a range of approximately 20–85°.

6. The pulse detonation system of claim 1, wherein said longitudinal axis of each said detonation passage is oriented at a radial angle to said longitudinal centerline axis.

7. The pulse detonation system of claim 1, wherein said detonation passages of each detonation stage are symmetrically spaced within said cylindrical member.

8. The pulse detonation system of claim 1, wherein said detonation passages are integral with said cylindrical member.

9. The pulse detonation system of claim 1, wherein said detonation passages are formed in replaceable segments connected to said cylindrical member.

10. The pulse detonation system of claim 1, wherein said detonation passages are aligned with each said port in a predetermined timing and sequence.

11. The pulse detonation system of claim 1, wherein the number of said detonation passages in said cylindrical member is a function of a radius for said cylindrical member.

12. The pulse detonation system of claim 2, wherein said first ends of said detonation passages of each detonation stage are arranged in a substantially annular configuration along said forward surface of said cylindrical member.

13. The pulse detonation system of claim 1, further comprising a plurality of detonation stages in said cylindrical member.

14. The pulse detonation system of claim 13, said detonation passages of each said detonation stage being arranged in a substantially annular configuration through said cylindrical member having a distinct radius.

15. The pulse detonation system of claim 1, wherein each said group of ports in said stator are oriented substantially parallel to said longitudinal centerline axis.

16. The pulse detonation system of claim 1, wherein each said group of ports in said stator are oriented at a predetermined angle to said longitudinal centerline axis.

17. The pulse detonation system of claim 1, each said group of ports in said stator further comprising an air port in flow communication with a source of compressed air.

18. The pulse detonation system of claim 1, each said group of ports in said stator further comprising a fuel port in flow communication with a fuel source.

19. The pulse detonation system of claim 1, each said group of ports in said stator further comprising a port having a device for initiating a detonation wave associated therewith.

20. The pulse detonation system of claim 1, further comprising a plurality of port groups provided in said stator, wherein a plurality of detonation cycles occur in a predetermined timing and sequence in each said detonation passage during a revolution of said cylindrical member.

21. The pulse detonation system of claim 20, said stator including a predetermined amount of circumferential space between each said port group.

22. The pulse detonation system of claim 1, further comprising a plurality of seals positioned between said stator and said forward surface of said cylindrical member.

23. The pulse detonation system of claim 1, further comprising a fuel manifold for supplying fuel to each said fuel port.

24. The pulse detonation system of claim 1, further comprising a device for controlling the injection of fuel into said detonation passages through said fuel ports.

25. The pulse detonation system of claim 24, further comprising a device for controlling the initiation of detonation waves in said detonation passages by said initiation devices.

26. A method of providing power to a drive shaft in a gas turbine engine, comprising the following steps:
   (a) providing a rotatable cylindrical member having a plurality of spaced detonation passages disposed therethrough at a circumferential angle to a longitudinal centerline axis through said cylindrical member;
   (b) providing a stator in spaced relation to a forward surface of said cylindrical member, said stator having at least one group of ports formed therein;
   (c) connecting said cylindrical member to a drive shaft;
   (d) performing a detonation cycle in each said detonation passage; and,
   (e) producing a torque on said cylindrical member by exhausting combustion gases through an aft surface of said cylindrical member, which causes said cylindrical member and said drive shaft to rotate.

27. The method of claim 26, said detonation cycle further comprising the steps of:

(a) supplying compressed air to said detonation passages;

(b) injecting fuel into said detonation passages;

(c) initiating a detonation wave in said detonation passages.

28. The method of claim 27, wherein said detonation wave is initiated at a predetermined point in said detonation passage.

29. The method of claim 27, wherein said detonation wave is initiated by a device igniting fuel and air in said detonation passage.

30. The method of claim 26, further comprising the step of causing said cylindrical member to rotate at a predetermined speed prior to injecting fuel into said detonation passages.

31. The method of claim 26, further comprising the step of aligning said detonation passages in a predetermined timing and sequence with an air port in said stator, a fuel port in circumferentially spaced relation to said air port, and a port having an initiation device associated therewith in circumferentially spaced relation to said fuel port.

32. A gas turbine engine, comprising:

(a) a fan section at a forward end of said gas turbine engine including at least a first fan blade row connected to a drive shaft;

(b) a booster compressor positioned downstream of said fan section, said booster compressor including a first compressor blade row and a second compressor blade row connected to said drive shaft and interdigitated with said first compressor blade row; and, (c) a pulse detonation system for powering said drive shaft, said pulse detonation system further comprising:

(1) a rotatable cylindrical member having a forward surface, an aft surface, and an outer circumferential surface, said cylindrical member including at least one detonation stage having a plurality of spaced detonation passages disposed therethrough and being connected to said drive shaft, each said detonation passage including at least a portion thereof with a longitudinal axis extending therethrough which is oriented at a circumferential angle to said longitudinal centerline axis; and, (2) a stator configured in spaced arrangement with said forward surface of said cylindrical member and a portion of said shaft, said stator including at least one group of ports formed therein alignable with said detonation passages as said cylindrical member rotates;

wherein detonation cycles are performed in said detonation passages so that combustion gases exit said aft surface of said cylindrical member to create a torque which causes said cylindrical member to rotate and power said fan section and said booster compressor.

33. The gas turbine engine of claim 32, each said group of ports in said stator further comprising:

(a) an air port in flow communication with a source of compressed air;

(b) a fuel port in flow communication with a fuel source; and, (c) a port having a device associated therewith for initiating a detonation in said detonation passages.

34. A gas turbine engine, comprising:

(a) a bellmouth at a forward end of said gas turbine engine;

(b) a compressor positioned downstream of and in flow communication with said bellmouth, said compressor including a first compressor blade row and a second blade row connected to a drive shaft and interdigitated with said first compressor blade row;

(c) a load connected to said drive shaft; and, (d) a pulse detonation system for powering said drive shaft, said pulse detonation system further comprising:

(1) a rotatable cylindrical member having a forward surface, an aft surface, and an outer circumferential surface, said cylindrical member including at least one detonation stage having a plurality of detonation passages disposed therein and being connected to said drive shaft, each said detonation passage including at least a portion thereof with a longitudinal axis extending therethrough which is oriented at a circumferential angle to said longitudinal centerline axis; and, (2) a stator configured in spaced arrangement to said forward surface of said cylindrical member and a portion of said shaft, said stator including at least one group of ports formed therein alignable with said detonation passages as said cylindrical member rotates;

wherein detonation cycles are performed in said detonation passages so that combustion gases exit said aft surface of said cylindrical member to create a torque which causes said cylindrical member to rotate and power said compressor and said load.

35. The gas turbine engine of claim 34, each said group of ports in said stator further comprising:

(a) an air port in flow communication with a source of compressed air, (b) a fuel port in flow communication with a fuel source; and, (c) a port having a device associated therewith for initiating a detonation in said detonation passages.

* * * * *